US010012102B2

(12) United States Patent
Teixeira

(10) Patent No.: US 10,012,102 B2
(45) Date of Patent: Jul. 3, 2018

(54) VARIABLE VANE SYNCHRONIZATION RING TRANSMISSION MECHANISM

(71) Applicant: UNITED TECHNOLOGIES CORPORATION, Farmington, CT (US)

(72) Inventor: John D. Teixeira, Palm City, FL (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 471 days.

(21) Appl. No.: 14/623,296

(22) Filed: Feb. 16, 2015

(65) Prior Publication Data

US 2015/0354400 A1    Dec. 10, 2015

Related U.S. Application Data

(60) Provisional application No. 61/942,770, filed on Feb. 21, 2014.

(51) Int. Cl.
| | | |
|---|---|---|
| *F16H 1/08* | (2006.01) | |
| *F01D 17/12* | (2006.01) | |
| *F16H 1/36* | (2006.01) | |
| *F01D 9/04* | (2006.01) | |
| *F01D 17/16* | (2006.01) | |

(Continued)

(52) U.S. Cl.
CPC .............. *F01D 17/12* (2013.01); *F01D 9/041* (2013.01); *F01D 17/162* (2013.01); *F16H 1/36* (2013.01); *F16H 19/001* (2013.01); *F05D 2220/32* (2013.01); *F16H 1/2836* (2013.01); *Y02T 50/671* (2013.01); *Y10T 74/1888* (2015.01)

(58) Field of Classification Search
CPC . F01D 17/12; F01D 17/14; F16H 1/36; F16H 19/001; F16H 1/2836; Y10T 74/1888
See application file for complete search history.

(56) References Cited

U.S. PATENT DOCUMENTS

| | | | | |
|---|---|---|---|---|
| 5,205,712 A | * | 4/1993 | Hamilton | B64C 11/44 416/155 |
| 2013/0210572 A1 | * | 8/2013 | Coles | F01D 17/20 475/331 |

FOREIGN PATENT DOCUMENTS

| | | |
|---|---|---|
| CN | 2661479 Y | 12/2004 |
| CN | 2875938 Y | 3/2007 |

(Continued)

OTHER PUBLICATIONS

English Abstract for CN101544181A—Sep. 30, 2009; 1pg.

(Continued)

*Primary Examiner* — Christopher Verdier
*Assistant Examiner* — Kayla McCaffrey
(74) *Attorney, Agent, or Firm* — Cantor Colburn LLP

(57) ABSTRACT

A transmission mechanism includes a planet gear, a set of sun gear teeth and a set of ring gear teeth. The planet gear is configured to be mounted to a synchronization ring for rotation relative to the synchronization ring about a planet gear axis. The set of sun gear teeth are meshed with teeth of the planet gear. The set of sun gear teeth is configured to rotate and drive motion of the planet gear in a circumferential direction about an axis of the set of sun gear teeth. The set of ring gear teeth are meshed with the teeth of the planet gear. The set of sun gear teeth and the set of ring gear teeth are spaced apart from one another.

20 Claims, 4 Drawing Sheets

(51) Int. Cl.
*F16H 19/00* (2006.01)
*F16H 1/28* (2006.01)

(56) References Cited

FOREIGN PATENT DOCUMENTS

| CN | 101544181 A | 9/2009 |
| CN | 102182801 A | 9/2011 |
| EP | 2626521 A1 | 8/2013 |
| GB | 2465997 A | 6/2010 |
| JP | 11217025 A | 8/1999 |
| JP | 2001043940 A | 2/2001 |
| WO | WO-2013/177785 A1 | 12/2013 |

OTHER PUBLICATIONS

English Abstract for CN102182801A—Sep. 14, 2011; 1 pg.
English Abstract for CN2661479Y—Dec. 8, 2004; 1 pg.
English Abstract for CN2875938Y—Mar. 7, 2007; 1 pg.
English Abstract for JP11217025A—Aug. 10, 1999; 1 pg.
English Abstract for JP2001043940—Feb. 16, 2001; 1 pg.
International Search Report for Application No. PCT/CN2012/076362; dated Mar. 7, 2013; 2 pgs.
Extended European Search Report dated Jul. 14, 2015, issued on corresponding European Patent Application No. EP 15156166.9.
European Search Report dated Dec. 6, 2017, issued on corresponding European Patent Application No. EP 17 18 5912.

\* cited by examiner

VARIABLE VANE SYNCHRONIZATION RING TRANSMISSION MECHANISM

CROSS-REFERENCE TO RELATED APPLICATION

This application claims the benefit of priority under 35 U.S.C. § 119(e) to U.S. Provisional Application No. 61/942,770, filed Feb. 21, 2014, which is incorporated herein by reference in its entirety.

STATEMENT REGARDING FEDERALLY SPONSORED RESEARCH OR DEVELOPMENT

This invention was made with government support under contract number N00014-09-D-0821-0006 awarded by the United States Navy. The government has certain rights in the invention.

BACKGROUND OF THE INVENTION

1. Field of the Invention

The present disclosure relates to transmission mechanisms, and more particularly to transmission mechanisms, such as in synchronization rings for variable vanes in gas turbine engines.

2. Description of Related Art

Traditionally, turbo fan engines for aircraft can include multiple stages of variable vanes to condition and guide airflow through the compressor and/or turbine sections. Variable vanes are configured to be pivoted about their respective vane axis to alter the angle of attack in order to optimize airflow characteristics for various operating conditions.

Variable vanes can be connected to a synchronization ring (sync ring), each by a respective vane arm connected to the stem of the respective vane. The sync ring can drive each variable vane counter-clockwise and/or clockwise around its respective longitudinal axis in order to adjust vane stage angle for a particular operating condition. Bell-crank style mechanisms are commonly used to convert the linear or rotational force and displacement of an actuator output shaft into an equivalent force and displacement suitable for driving the sync ring over the desired range of angular rotation. Depending on the desired range of angular displacement of the variable vanes, the limitation on input angle for bell-crank style mechanisms can limit the mechanical advantage that can be achieved through the bell-crank mechanism. This can ultimately limit the accuracy of angle of attack for traditional variable vane systems.

Such conventional methods and systems have generally been considered satisfactory for their intended purpose. However, there is still a need in the art for improved transmission mechanisms. The present disclosure provides a solution for this need.

SUMMARY OF THE INVENTION

A transmission mechanism includes a planet gear, a set of sun gear teeth and a set of ring gear teeth. The planet gear is configured to be mounted to a synchronization ring (sync ring) for rotation relative to the sync ring about a planet gear axis. The set of sun gear teeth are meshed with teeth of the planet gear. The set of sun gear teeth is configured to rotate and drive motion of the planet gear in a circumferential direction about an axis of the set of sun gear teeth. The set of ring gear teeth are meshed with the teeth of the planet gear. The set of sun gear teeth and the set of ring gear teeth are spaced apart from one another.

It is contemplated that a center of the planet gear can be configured to move along an arcuate path. A circle defined by the arcuate path can be concentric with the set of sun gear teeth. The transmission mechanism can include an input shaft configured to extend in a radially outward direction with respect to a sync ring. The input shaft can have a first end and a second end and can define an actuator axis therebetween. The set of sun gear teeth can be defined proximate to the first end of the input shaft and can operatively connect the input shaft to the planet gear. The input shaft can be configured to rotate the set of sun gear teeth about the actuator axis. The set of sun gear teeth can be concentric with the input shaft. The input shaft can be configured to be normal to a rotation axis of a sync ring and to be mounted to the planet gear.

The transmission mechanism can include a housing that can be operatively connected to the set of ring gear teeth. The housing can surround at least a portion of the set of sun gear teeth and/or the planet gear. In addition, the housing can be configured to be disposed radially outward of a sync ring mounted to the planet gear and can be configured to be stationary with respect to the set of ring gear teeth and an axis of the set of sun gear teeth.

The planet gear can be configured to connect to a sync ring through a spherical joint. An end surface of the housing can define a gear plane. The spherical joint can be configured to allow the planet gear to remain parallel with respect to the gear plane throughout an arc of motion. In addition, the spherical joint can be configured to allow a sync ring to rotate about and move axially with respect to a centerline axis to follow the arc of motion of the planet gear.

It is also contemplated the set of ring gear teeth can be disposed on a partial ring gear defining a segment of a full ring gear. The set of sun gear teeth can be circumferentially disposed on a periphery of a partial sun gear defining a segment of a full sun gear.

A variable vane system includes a sync ring defining a centerline axis, a plurality of variable vanes, and a transmission mechanism similar to the transmission mechanism described above. The transmission mechanism is configured to drive motion of sync ring in an axial and rotational direction with respect to the centerline axis. The plurality of variable vanes are operatively connected to the sync ring such that the axial and rotational motion of the sync ring drives the rotation of the variable vanes to adjust the angle of attack of the variable vanes. It is contemplated that the variable vane system can include a plurality of vane arms operatively connecting an end of each variable vane to the sync ring. It is also contemplated that the housing can surround at least a portion of the transmission mechanism.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
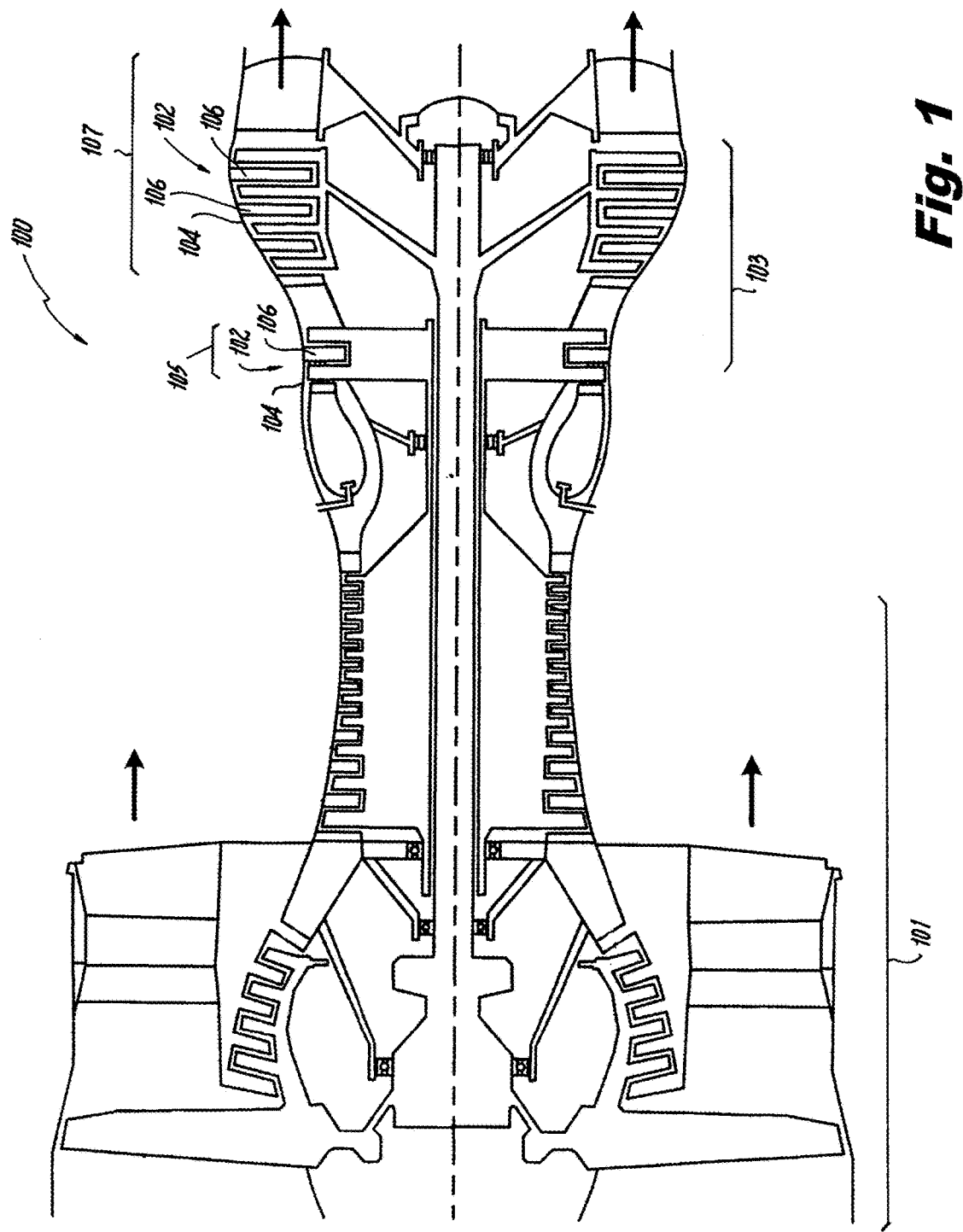
FIG. 1 is a schematic cross-sectional side elevation view of an exemplary embodiment of a gas turbine engine constructed in accordance with the present disclosure, showing a location of a variable vane system.

Reference will now be made to the drawings wherein like reference numerals identify similar structural features or aspects of the subject disclosure. For purposes of explanation and illustration, and not limitation, a cross-sectional view of an exemplary embodiment of the gas turbine engine constructed in accordance with the disclosure is shown in FIG. 1 and is designated generally by reference character 100. Other embodiments of gas turbine engines constructed in accordance with the disclosure, or aspects thereof, are provided in FIGS. 2-5, as will be described.

As shown in FIG. 1, a variable vane system 102 includes a case 104 and a plurality of variable vanes 106. Variable vane system 102 is disposed in turbine section 103 of gas turbine engine 100. Variable vanes 106 are stator vanes and project radially inward from case 104. Variable vane system 102 are shown in a high pressure turbine section 105 but could also be applied in a low pressure turbine section 107. Those skilled in the art will also readily appreciate that variable vane system 102 can also be disposed in a compressor section 101 of gas turbine engine 100, or can be used in any other suitable application.

Figure 2:
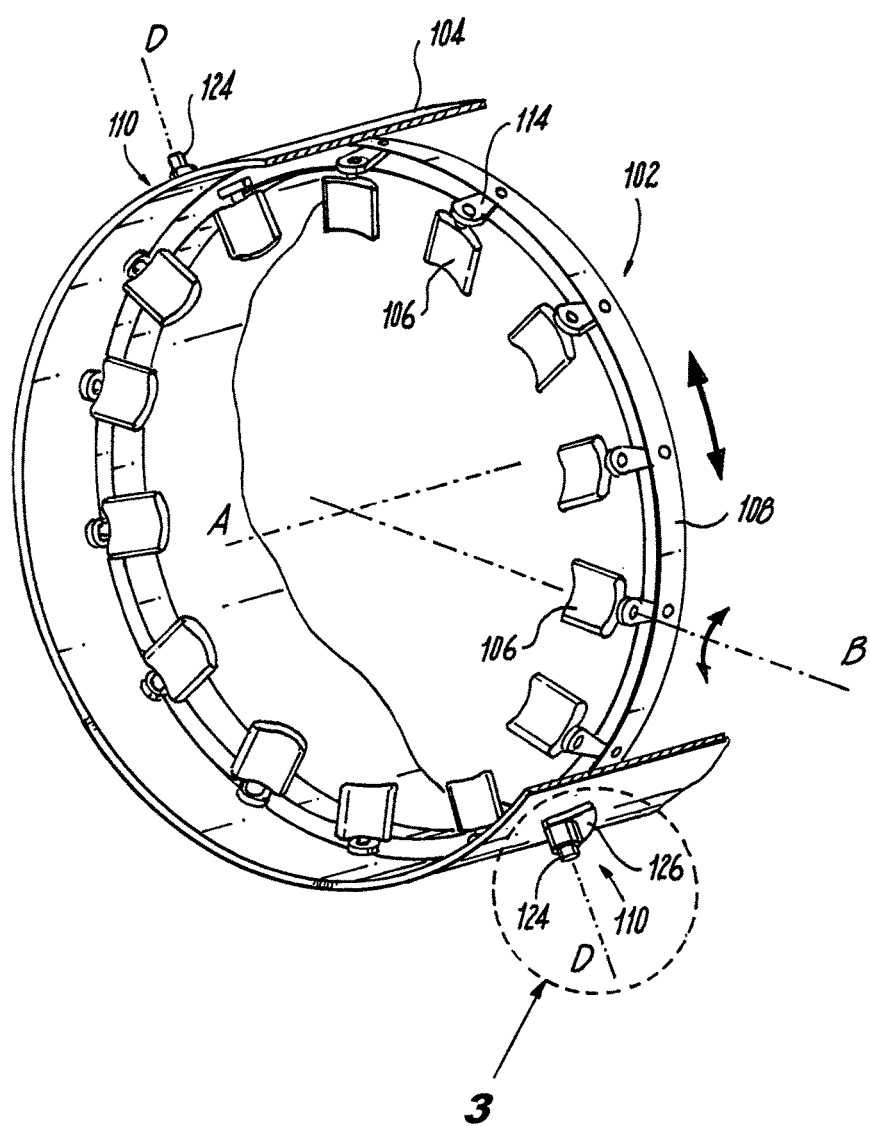
FIG. 2 is a schematic partial perspective view of a portion of the gas turbine engine shown in FIG. 1, showing an engine case and a synchronization ring surrounding the turbine.

As shown in FIG. 2, variable vane system 102 includes a synchronization ring 108 (sync ring) disposed radially inward of case 104 defining a centerline axis A and a transmission mechanism 110. While sync ring 108 is shown and described herein as being disposed radially inward of case 104, those skilled in the art will readily appreciate that, depending on the application, sync ring 108 can be disposed radially outward of case 104. Variable vanes 106 project radially inward from case 104. The sync ring 108 is operatively connected to the variable vanes 106 such that the axial and rotational motion of sync ring 108 drives the rotation of variable vanes 106 about a vane axis B to adjust their angle of attack. The rotation of sync ring 108 about centerline axis A is indicated schematically by a double-headed arrow. The rotation of variable vanes 106 about vane axis B is also indicated schematically by a separate double-headed arrow. Variable vane system 102 includes a plurality of vane arms 114 operatively connecting a vane stem of each variable vane 106 to sync ring 108. Those skilled in the art will readily appreciate that while variable vane system 102 is shown with two transmission mechanisms 110, any suitable number of transmission mechanisms may be used.

Figure 3:
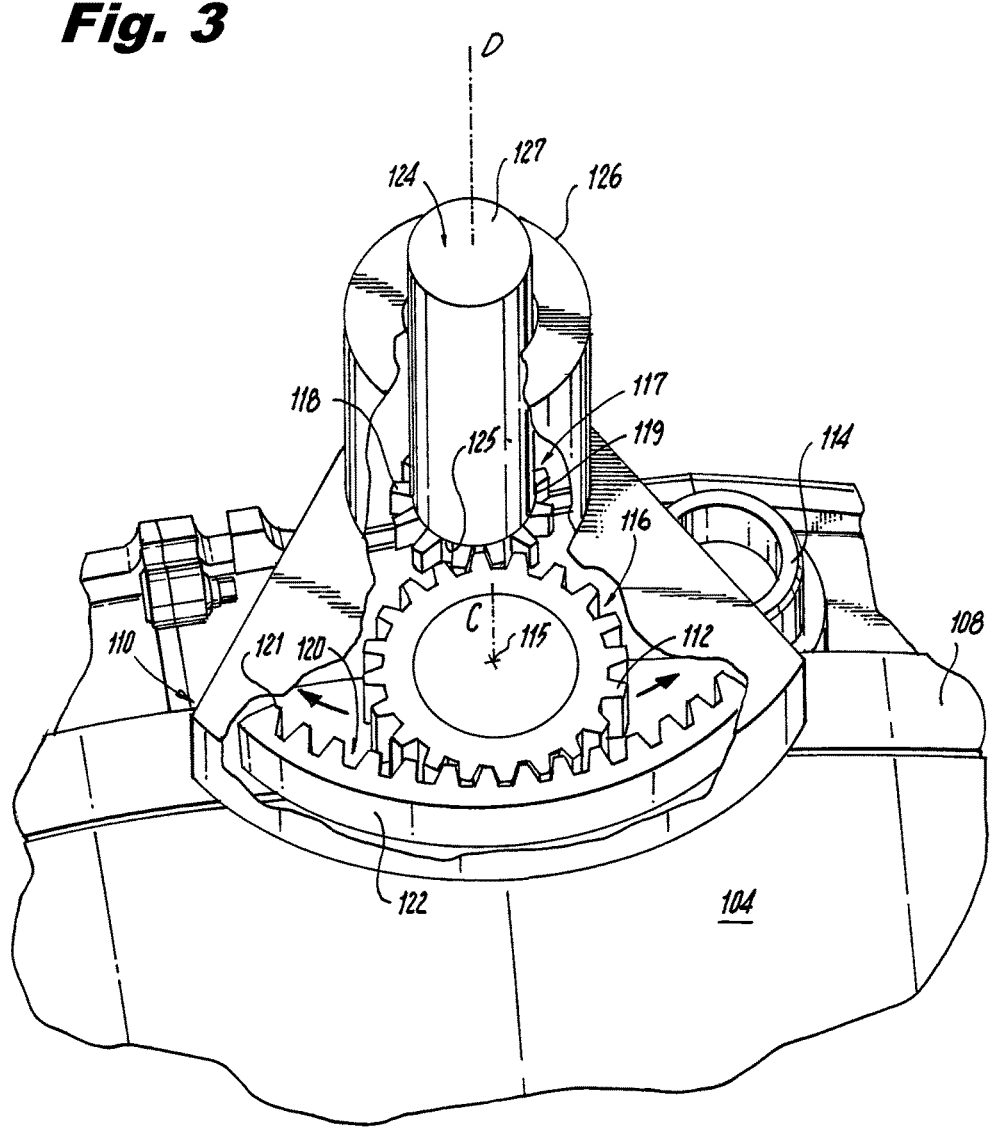
FIG. 3 is a cut-away perspective view of a portion of a variable vane system of the gas turbine engine shown in FIG. 1, showing a synchronization ring, a transmission mechanism, and a vane arm.

With reference now to FIG. 3, transmission mechanism 110 includes a planet gear 116, a set of sun gear teeth 118 and a set of ring gear teeth 120. Planet gear 116 is mounted to sync ring 108 for rotation relative to sync ring 108 about a planet gear axis C. Transmission mechanism 110 includes a ring gear segment 122. The set of ring gear teeth 120 is disposed on a partial ring gear 121 defining ring gear segment 122. Transmission mechanism 110 converts the rotational motion of an input shaft 124, described below, into curvilinear motion for driving sync ring 108.

With continued reference to FIG. 3, transmission mechanism 110 includes a full sun gear 117. The set of sun gear teeth 118 is circumferentially disposed on a periphery of a partial sun gear 119 defining a segment of full sun gear 117. The sun gear teeth 118 mesh with teeth 112 of planet gear 116. The sun gear teeth 118 are configured to rotate and drive the motion of planet gear 116 in a circumferential direction, about an axis D of the set of sun gear teeth 118. The ring gear teeth 120 are meshed with teeth 112 of planet gear 116. The sun gear teeth 118 and the ring gear teeth 120 are spaced apart from one another, so as not to interfere with one another. The sun gear teeth 118 are configured to rotate and drive motion of sync ring 108 in an axial and rotational direction with respect to the centerline axis A, indicated by the double-headed arrow in FIG. 2. A center 115 of planet gear 116 is configured to move along an arcuate path indicated schematically by the arrows in FIG. 3. A circle defined by the arcuate path is concentric with sun gear 117 and the set of sun gear teeth 118.

With continued reference to FIG. 3, those skilled in the art will readily appreciate that due to the connection of sync ring 108 and vane arms 114, a single point on the surface of sync ring 108 moves in a curvilinear path as sync ring 108 is moved through its incremental range of positive and negative angular rotation about centerline axis A. When this displacement path is viewed from any plane whose normal intersects centerline axis A, the path of sync ring 108 displacement appears as a simple arc, similar to the arcuate path traveled by center 115 of planet gear 116. Those skilled in the art will readily appreciate that the radius of this simple arc of travel of planet gear 116 is equal to one half of the sum of the pitch diameters of sun gear 117 and planet gear 116. By establishing the pitch diameters of sun gear 117 and planet gear 118 such that the distance between their centers exactly matches the radius of the arc of displacement of sync ring 108, planet gear 116 can drive sync ring 108 by attaching sync ring 108 to a bore of planet gear 116.

As shown in FIGS. 2 and 3, transmission mechanism 110 includes an input shaft 124 extending in a radially outward direction with respect to case 104. Input shaft 124 has a first end 125 and a second end 127 and defines an actuator axis therebetween. Actuator axis is the same as axis D of the set of sun gear teeth 118 because sun gear 117 is concentric with input shaft 124. Sun gear 117 is positioned proximate to first end 125 of input shaft 124 and operatively connects input shaft 124 to planet gear 116. Input shaft 124 is configured to rotate sun gear 117 about actuator axis D. Input shaft 124 is mounted normal relative to the centerline axis A of sync ring 108.

With continued reference to FIGS. 2 and 3, transmission mechanism 110 includes a housing 126 that is connected to ring gear segment 122. Housing 126 surrounds at least a portion of sun gear 117 and/or a portion of planet gear 116. In addition, housing 126 is mounted radially outward of sync ring 108 and case 104 and is configured to be stationary with respect to ring gear segment 122 and an axis of sun gear 117 and to case 104. Axis D of sun gear 117 is coincident with actuator axis D.

Those skilled in the art will readily appreciate that the diameter of sun gear 117 (and consequently, the diameter of planet gear 116) can be varied such the gear ratio of sun gear 117 to planet gear 116 can be set to any suitable value for a given application. Those skilled in the art will also readily appreciate that the distance between the center of sun gear 117 and center 115 of planet gear 116 for any given application depends on the radius at which planet gear 116 is attached to sync ring 108.

Those skilled in the art will also readily appreciate that the diametral pitch of the gear set can be chosen such that there are an integral number of teeth on planet gear 116. In addition, those skilled in the art will readily appreciate that it is not necessary that a full ring gear have an integral number of teeth, because only ring gear segment 122 is required. Likewise, it is contemplated that if the gear ratio is such that sun gear 117 will make less than a full turn when the system is operated over the total required range of operation, then a full sun gear, e.g. sun gear 117, is not required and only sun gear teeth 118, e.g. a portion of full sun gear 117, is required to have an integral number of teeth, as will be described below. Those skilled in the art will readily appreciate that the mechanical advantage of the system can be easily modified by changing the relative diameters of sun gear 117 and planet gear 116. This allows the total operating range of input shaft 125 to be independently optimized for either a linear actuator or a rotary actuator.

Figure 4:
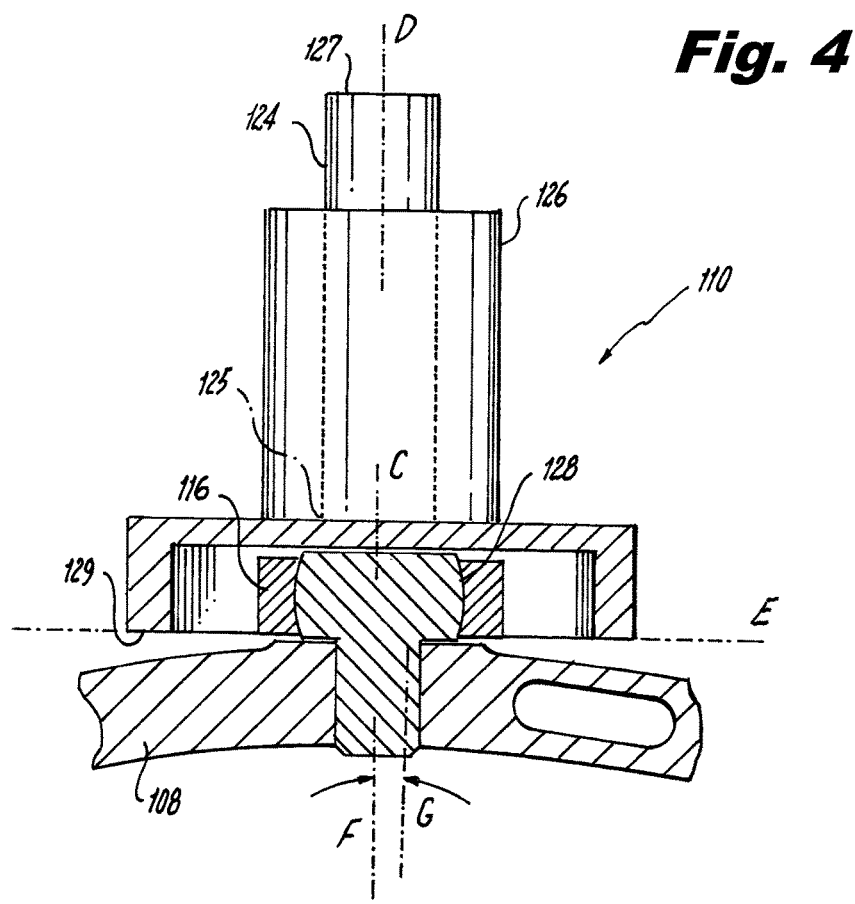
FIG. 4 is a partial cross-sectional view of an exemplary embodiment of the transmission mechanism of FIG. 3, showing a spherical joint and a planet gear.

As shown in FIG. 4, planet gear 116 is connected to sync ring 108 through a spherical joint 128. An end surface 129 of housing 126 defines a gear plane E, which extends in and out of the page, as shown in FIG. 4. Those skilled in the art will readily appreciate that sync ring 108 and spherical joint 128 are rotated away from its initial starting position designated by radial line F, shown in FIG. 4, the middle of its angular range of operation, to a radial line G. Radial line F is normal to gear plane E while radial line G is not normal to gear plane E due to the rotation of sync ring 108 about centerline axis A.

In order to accommodate for this misalignment, spherical joint 128 is configured to allow planet gear 116 remain substantially parallel to gear plane E while allowing sync ring 108 to rotate about and move axially with respect to centerline axis A. Those skilled in the art will readily appreciate that even with the incorporation of spherical joint 128 to absorb the misalignment brought about by rotating sync ring 108 about centerline axis A, there can be a displacement of planet gear 116 relative to the gear plane E, i.e. planet gear 116 will move vertically with respect to gear plane E, as oriented in FIG. 4. The thickness of planet gear 116, sun gear 117, and ring gear segment 122 can be configured to allow for this vertical motion.

Figure 5:
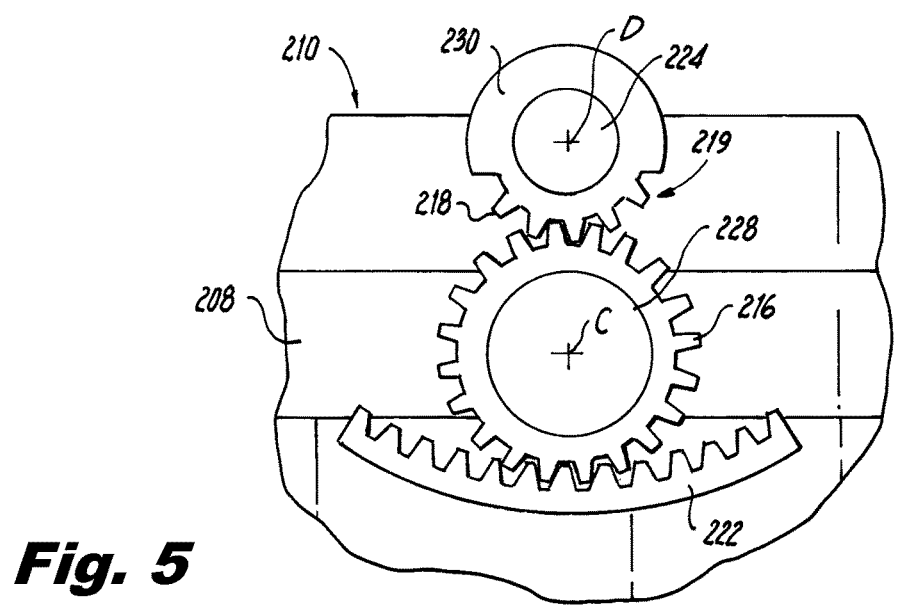
FIG. 5 is a schematic partial plan view of an exemplary embodiment of a transmission mechanism constructed in accordance with the present disclosure, showing a partial sun gear.

With reference now to FIG. 5, a transmission mechanism 210 is similar to transmission mechanism 110, described above. In transmission mechanism 210, a partial sun gear 219 makes less than a full turn when the system is operated over the total required range of operation, therefore a full sun gear, e.g. sun gear 117, is not required. A set of sun gear teeth 218 are circumferentially disposed on a periphery of partial sun gear 219, while a portion 230 of partial sun gear 219 remains without sun gear teeth 218.

Those skilled in the art will readily appreciate that transmission mechanisms, e.g. transmission mechanisms 110 and 210, tend to provide an increased mechanical advantage compared to that of a traditional bell-crank mechanism. For example, if the input angle of a bell-crank mechanism is a total range of 90 degrees, i.e. 45 degrees in one direction and 45 degrees in the opposite direction, and the sync ring must drive the variable vanes over a total range of 30 degrees of rotation, then the limitation on input angle means that a maximum mechanical advantage of 3:1 can be achieved. This 90 degree limitation on the input angle of a bell-crank mechanism is generally imposed to maintain an approximately linear correlation between the input angle and the output displacement of the bell-crank mechanism. Any other suitable mechanical advantage can be used for a given application without departing from the scope of this disclosure.

Those skilled in the art will also readily appreciate that variable vane position is generally measured implicitly by measuring the angular position of an actuator output shaft. By virtue of the increased mechanical advantage of transmission mechanisms, e.g. transmission mechanisms 110 and 210, and the accompanying increase in the angular displacement of the actuator output shaft, the vane position measurement tends to be more accurate than transmission systems having lower mechanical advantage and correspondingly smaller actuator output shaft displacement ranges.

In addition, those skilled in the art will readily appreciate that in order for a bell-crank mechanism to achieve a similar displacement to that of transmission mechanisms, e.g. transmission mechanisms 110 and 210, a bell-crank mechanism tends to require input from a larger actuator, capable of generating larger actuation forces, than is required for transmission mechanisms. Those skilled in the art will also readily appreciate that larger actuation forces, such as those used in traditional bell-crank mechanisms tend to require larger linkage components between the actuator and the bell-crank mechanism than those required for transmission mechanisms, tending to make the actuator system using the bell-crank mechanism heavier than one using transmission mechanisms.

Those skilled in the art will readily appreciate that for a given input shaft rotation angle, the arrangement described herein has the potential to provide a greater degree of mechanical advantage than a simple bellcrank arrangement and would therefore reduce actuator torque requirements and actuation linkage loads, potentially reducing actuation system weight while improving accuracy.

The methods and systems of the present disclosure, as described above and shown in the drawings, provide for transmission mechanisms and variable vane systems with superior properties including potentially improved mechanical advantage, potentially increased accuracy and potentially reduced weight. While the apparatus and methods of the subject disclosure have been shown and described with reference to preferred embodiments, those skilled in the art will readily appreciate that changes and/or modifications may be made thereto without departing from the spirit and scope of the subject disclosure.

What is claimed is:

1. A transmission mechanism comprising:
   a synchronization ring configured for rotation about a centerline axis (A);
   a planet gear configured to be mounted to a synchronization ring for rotation relative to the synchronization ring about a planet gear axis;
   a set of sun gear teeth meshed with teeth of the planet gear, wherein the set of sun gear teeth is configured to rotate and drive motion of the planet gear in a circumferential direction about an axis of the set of sun gear teeth, the set of sun gear teeth actuates the synchronization ring for axial and rotational motion with respect to the centerline axis and wherein the axis (D) is normal to the centerline axis (A); and a set of ring gear teeth meshed with the teeth of the planet gear, wherein the set of sun gear teeth and the set of ring gear teeth are spaced apart from one another.

2. A transmission mechanism as recited in claim 1, wherein a center of the planet gear is configured to move along a arcuate path, wherein a circle defined by the arcuate path is concentric with the set of sun gear teeth.

3. A transmission mechanism as recited in claim 1, further comprising an input shaft configured to extend in a radially outward direction with respect to the synchronization ring, the input shaft having a first end and a second end, defining an actuator axis therebetween, wherein the set of sun gear teeth is defined proximate to the first end of the input shaft operatively connecting the input shaft to the planet gear.

4. A transmission mechanism as recited in claim 3, wherein the input shaft is configured to rotate the set of sun gear teeth about the actuator axis.

5. A transmission mechanism as recited in claim 3, wherein the set of sun gear teeth is concentric with the input shaft.

6. A transmission mechanism as recited in claim 3, wherein the input shaft is configured to be mounted to the sun gear and to be normal to the centerline axis of the synchronization ring.

7. A transmission mechanism as recited in claim 1, further comprising a housing operatively connected to the set of ring gear teeth and surrounding at least a portion of at least one of the set of sun gear teeth and the planet gear, wherein the housing is configured to be disposed radially outward of a synchronization ring and configured to be stationary with respect to the set of ring gear teeth and an axis of the set of sun gear teeth.

8. A transmission mechanism as recited in claim 1, wherein the planet gear is configured to connect to a synchronization ring through a spherical joint, wherein an end surface of a housing defines a gear plane, wherein the spherical joint is configured to allow the planet gear to remain parallel with respect to the gear plane throughout an arc of motion, and wherein the spherical joint is configured to allow a synchronization ring to rotate about and move axially with respect to the centerline axis to follow an arc of motion of the planet gear.

9. A transmission mechanism as recited in claim 1, wherein the set of ring gear teeth is disposed on a partial ring gear defining a segment of a full ring gear.

10. A transmission mechanism as recited in claim 1, wherein the set of sun gear teeth is circumferentially disposed on a periphery of a partial sun gear defining a segment of a full sun gear.

11. A variable vane system, comprising:
a synchronization ring defining a centerline axis;
a transmission mechanism including:
a planet gear mounted radially outward of the synchronization ring for rotation relative to the synchronization ring about a planet gear axis;
a set of sun gear teeth meshed with teeth of the planet gear, wherein the set of sun gear teeth is configured to rotate and drive motion of the planet gear in a circumferential direction about an axis of the set of sun gear teeth, actuating the synchronization ring for axial and rotational motion with respect to the centerline axis; and
a set of ring gear teeth meshed with the teeth of the planet gear, wherein the set of sun gear teeth and the set of ring gear teeth are spaced apart from one another; and
a plurality of variable vanes operatively connected to the synchronization ring such that the axial and rotational motion of the synchronization ring drives the rotation of the variable vanes to adjust the angle of attack of the variable vanes.

12. A variable vane system as recited in claim 11, wherein a center of the planet gear is configured to move along an arcuate path, wherein a circle defined by the arcuate path is concentric with the set of sun gear teeth.

13. A variable vane system as recited in claim 11, further comprising a plurality of vane arms operatively connecting an end of each variable vane to the synchronization ring.

14. A variable vane system as recited in claim 11, further comprising an input shaft extending in a radially outward direction with respect to the synchronization ring, the input shaft having a first end and a second end, defining an actuator axis therebetween, wherein the set of sun gear teeth is defined proximate to the first end of the input shaft operatively connecting the input shaft to the planet gear.

15. A variable vane system as recited in claim 14, wherein the input shaft is configured to rotate the set of sun gear teeth about the actuator axis.

16. A variable vane system as recited in claim 14, wherein the input shaft is normal to the centerline axis of the synchronization ring.

17. A variable vane system as recited in claim 11, further comprising a housing disposed radially outward of the synchronization ring operatively connected to the set of ring gear teeth and surrounding at least a portion of the transmission mechanism, wherein the housing is configured to be stationary with respect to the set of ring gear teeth and an axis of the set of sun gear teeth.

18. A variable vane system as recited in claim 11, wherein the planet gear is connected to the synchronization ring through a spherical joint, wherein an end surface of a housing defines a gear plane, wherein the spherical joint is configured to allow the planet gear to remain parallel with respect to the gear plane throughout an arc of motion, and wherein the spherical joint is configured to allow a synchronization ring to rotate about and move axially with respect to the centerline axis to follow an arc of motion of the planet gear.

19. A variable vane system as recited in claim 11, wherein the set of ring gear teeth is disposed on a partial ring gear defining a segment of a full ring gear.

20. A variable vane system as recited in claim 11, wherein the set of sun gear teeth is circumferentially disposed on a periphery of a partial sun gear defining a segment of a full sun gear.

* * * * *